United States Patent [19]

Berg

[11] 4,300,963
[45] Nov. 17, 1981

[54] METHOD OF MANUFACTURING CYLINDRICAL TUBES AND APPARATUS FOR CARRYING OUT THE METHOD

[75] Inventor: Rolf Berg, Djursholm, Sweden

[73] Assignee: Assi Can Aktiebolag, Djursholm, Sweden

[21] Appl. No.: 183,492

[22] Filed: Sep. 2, 1980

Related U.S. Application Data

[63] Continuation of Ser. No. 966,998, Dec. 6, 1978, abandoned.

[30] Foreign Application Priority Data

Nov. 1, 1978 [SE] Sweden .............................. 7811314

[51] Int. Cl.³ ...................... B29C 25/00; B31F 81/00; B29C 17/04; B65D 85/66
[52] U.S. Cl. ..................................... 156/82; 156/187; 156/215; 428/36; 206/407; 229/93; 493/297
[58] Field of Search ................. 156/162, 215, 187, 82, 156/192, 188, 182; 206/407, 446; 229/37 R, 39 R, 93; 428/36, 57, 222; 493/272, 276, 291, 294, 297, 299, 303, 307

[56] References Cited

U.S. PATENT DOCUMENTS

| | | | |
|---|---|---|---|
| 2,555,380 | 6/1951 | Stuart et al. | 229/93 |
| 2,888,043 | 5/1959 | Reid | 229/93 |
| 2,941,911 | 6/1960 | Kumnick et al. | 156/162 |
| 3,190,780 | 6/1965 | McNulty et al. | 156/162 |
| 3,196,762 | 7/1965 | Schmeltz | 493/297 |
| 3,331,549 | 7/1967 | Beasley | 493/294 |
| 3,525,656 | 8/1970 | Kennedy, Jr. | 156/187 |
| 4,087,299 | 5/1978 | Berg | 156/192 |

*Primary Examiner*—John E. Kittle
*Assistant Examiner*—L. Falasco
*Attorney, Agent, or Firm*—Sughrue, Mion, Zinn, Macpeak and Seas

[57] ABSTRACT

In the manufacture of cylindrical tubes for containers, a foil web and at least one fibre web are helically wound on a heated, rotating mandril. The foil web is wider than the fibre web and its edges lie outside the long edges of the fibre web. The foil web and the fibre web are fed in to the mandril at an angle such that the free edges of the foil web are placed against each other and welded together.

5 Claims, 4 Drawing Figures

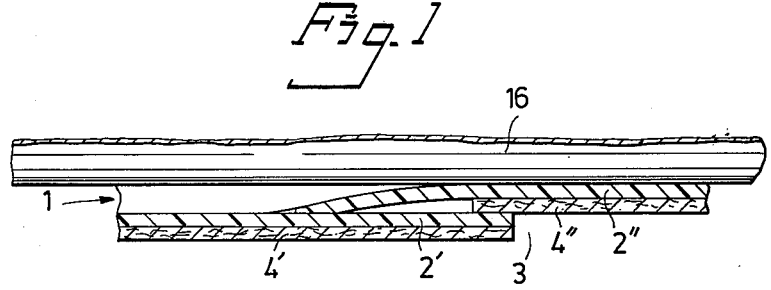
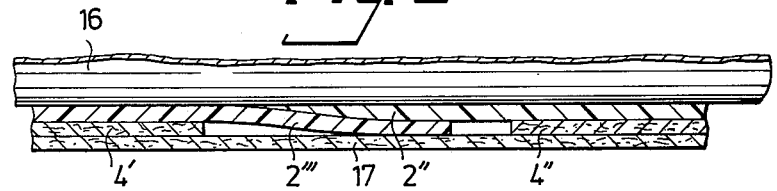
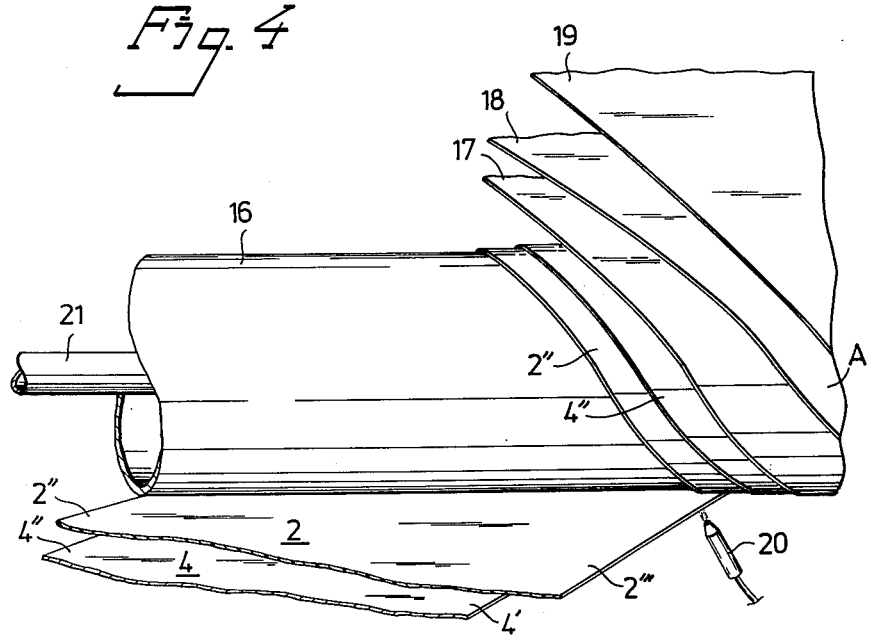

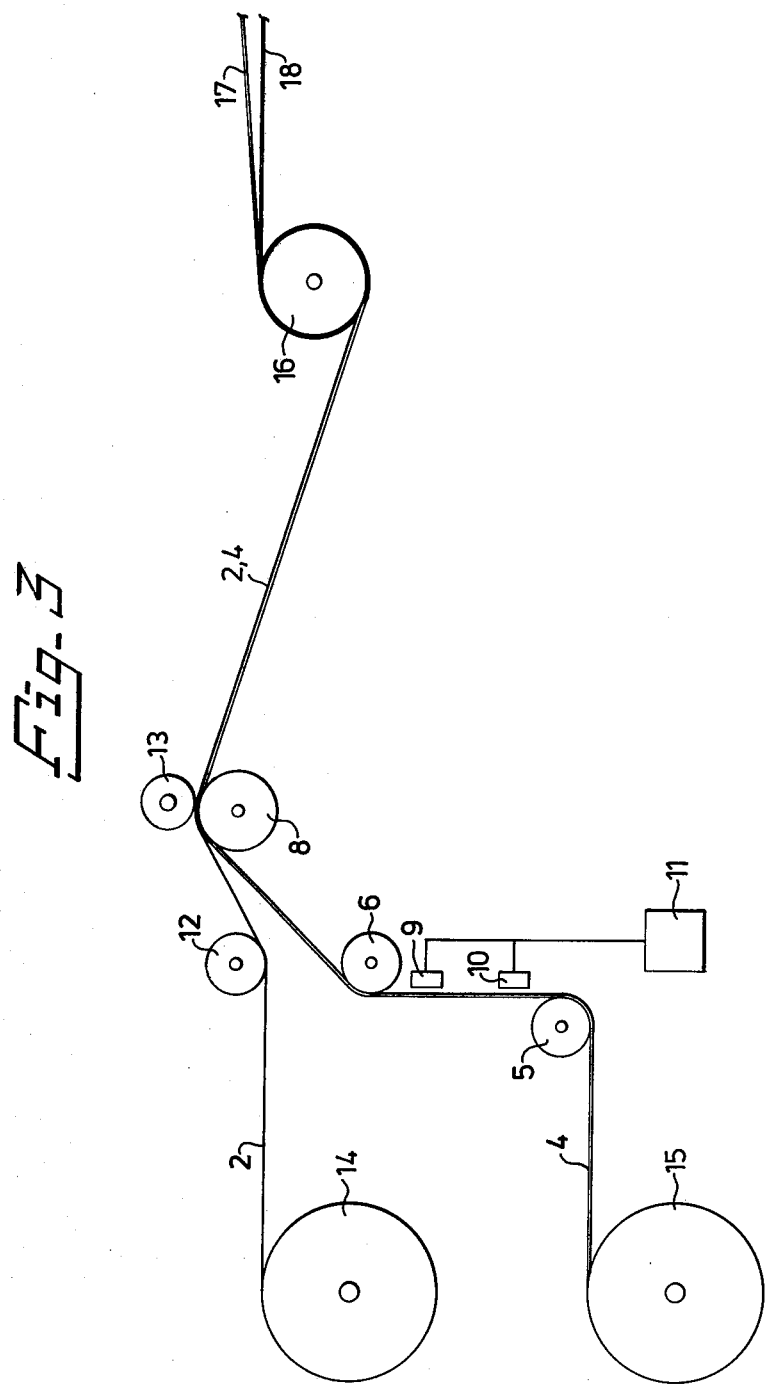

METHOD OF MANUFACTURING CYLINDRICAL TUBES AND APPARATUS FOR CARRYING OUT THE METHOD

This is a continuation of application Ser. No. 966,998, filed Dec. 6, 1978, now abandoned.

The present invention relates to a method and an apparatus for manufacturing cylindrical tubes, in which a plastics-foil web comprising a heat-meltable plastics material, and a first fibre web are helically wound on a rotating, heated mandril with the plastics-foil web in contact with the mandril, the surface of the fibre web facing the plastics-foil web being coated with a layer of plastics which can be made tacky or molten by applying heat thereto, thereby to be joined to the plastics-foil web, an edge portion along one longitudinally extending edge of the plastics-foil web being sealingly heat-welded with an edge portion along an opposing longitudinal edge of the plastics-foil web whilst winding said webs around said mandril. One method of manufacturing a laminated tube in accordance with the aforedescribed method is given in the U.S. Pat. No. 4,087,299.

The known method of providing a liquid-tight joint between the edges of the respective foil web have been found totally satisfactory, even when difficulty weldable resins have been used, more specifically high density plastics. When the tube is to conduct certain liquids, extremely thick high density plastics must be used, or other plastics which can be heat-welded and which have thicknesses of the order or magnitude of 300–500 $\mu$m must, in certain instances, be used in order for a liquid-tight and diffusion-tight container to be obtained. As will be explained hereinafter with reference to the drawings, this means that a container manufactured from a tube according to the invention and comprising a short tube-length and a lid and/or a bottom made, for example, of sheet metal, will not be fully sealed. This is due to the fact that the inner surface and outer surface of the said tube-length are not completely cylindrical, but exhibit "steps" in the region of the overlapping edges. Such a step has a height of approximately 600 $\mu$m when the fibre web, which comprises a cart liner or similar paper product, has a thickness of 300 $\mu$m and the foil web has a thickness of 300 $\mu$m. It will be obvious to one of normal skill in the art that this step can only be pressed out with great difficulty in order to obtain sealed abutment with the circumference of the bottom of the container for example. Consequently it is a prime object of the invention to provide a method of the type mentioned in the introduction which enables the inner surfaces and outer surfaces of the manufactured tube to be completely smooth or at least substantially completely smooth in order to eliminate sealing difficulties when a lid or a bottom is pressed into a respective end of said tube.

A further object is to provide a method which can be used to advantage irrespective of the type of heat-weldable plastics foil used and irrespective of the thickness of the foil.

The invention also relates to an apparatus for carrying out the novel method.

BRIEF DESCRIPTION OF THE DRAWINGS

So that the invention will be more readily understood and further features thereof made apparent, an embodiment of the invention will now be described with reference to the accompanying drawings, in which FIG. 1 is a sectional view of a welding joint through the plastics foil in accordance with a known method, taken perpendicularly to the geometric axis of the tube, FIG. 2 illustrates a corresponding sectional view through a joint made in accordance with the invention, FIG. 3 is a simplified view of the essential components of an apparatus in accordance with the invention, FIG. 4 illustrates how the fibre web and the foil web are wound on the mandril and illustrates exemplary means for heating the edge portions of the plastics foil.

FIG. 1 illustrates a section through a welding joint and adjacent parts of the plastics foil web and the fibre web obtained when applying the known method mentioned in the introduction. The mutually opposing longitudinally extending edge parts of the foil web are identified by 2' and 2'' respectively while the mutually opposing longitudinally extending edge parts of the fibre web are identified by the references 4' and 4'' respectively. As will be seen from FIG. 1, the edge parts 2'' of the plastics foil projects outside the edge portion 4' and when the webs are helically wound on the mandril said edge portion is welded with the edge portion 2', as is described in more detail in the U.S. Pat. No. 4,087,299. It will also be seen that although the webs can be compressed by means of a further fibre web there will appear nearest the mandril, which abuts the plastics foil, a shoulder or step 1, while a further step 3 occurs on the outside, which means that air will be enclosed longitudinally if a further fibre web is wound on the tube. The principle of the invention is illustrated simply in FIG. 2. The plastics foil projects out on both sides of the fibre web and exhibits the free edge parts 2'' and 2''' which overlap each other when wound on the mandril 16 and are heat-welded together. The two edge parts 4' and 4'' of the fibre web are spaced apart and during the welding operation the edge portions 2'' and 2''' will sink down in the space between the edge portions 4' and 4'' under the pressure exerted by a further fibre web 17 wound on the mandril 16 thereby to provide, as hereinafter described, a completely smooth, step-free inner and outer surface, the most important feature being that the inner surface is free from steps.

FIG. 3 illustrates a storage roll 14 for a plastics foil web 2, for example a web of high density polyethene. A paper web 4, for example a craft liner, is wound on a storage roll 15. The side of the paper web 4 remote from the centre of the storage roll 15 is coated with a layer of plastics, for example a layer of high density polyethene.

The paper web 4 extends from the storage roll 15 over a freely running direction roller 5 and from the roller 5 to a freely running direction roller 6. The paper web 4 extends from the direction roller 6 over a freely running direction roller 8. In the illustrated embodiment there is arranged between the two direction rollers 5 and 6 two heating elements 9 and 10 to which energy is supplied from a source 11. The heating elements 9 and 10 may comprise electric resistance elements arranged to be heated to red heat, or may have the form, for example of gas burners. Thus, heat is supplied to the surface of the paper web 4 facing the elements 9 and 10, and the plastic layer on the other side of the paper web is brought to a tacky state or preferably to a molten state which means, when the plastic layer comprises a high density plastics, that the paper web is heated to a temperature of 130°–150° C.

If the plastics foil web 2 is thin, for example having a thickness of 25 $\mu$m, the temperature of the web may be room temperature, even though the plastics may be a high density plastics. The plastics foil web 2 is preferably heated, however, if it comprises a high density plastics and has a thickness in excess of 50 μm. Preferably the plastics foil is heated by placing the roll 14 in a heating chamber for a period of time suficient for the centre of the roll to be heated to, for example 80° C. The temperature, however, should not be of such magnitude that the foil approaches its softening point, since the web is subjected to tension forces during the whole of its movement to the mandril 16.

In the illustrated embodiment, the plastics foil web 2 passes beneath a freely rotating guide roller 12, and from there over the paper web 4 on the guide roller 8. In this manner the two webs are bonded to each other to a certain extent, and if good bonding is desired there is used a pressure roller 13 which co-acts with the guide roller 8 to press the two webs together.

The two webs 2, 4 then extend to the mandril 16 which is caused to rotate about its centre axis by means of a drive device not shown. In the illustrated embodiment there is wound on the two webs 2 and 4, which webs are drawn through the apparatus from respective supply rolls 14, 15 and wound helically on the mandril 16, with three further fibre webs 17, 18 and 19. Similar to the fibre web 4, these fibre webs have a plastic coating which can be melted or at least brought to a tacky state by means of heating devices not shown, for example heating devices of the kind shown at 9 and 10. As will be understood, the plastic coatings on the fibre web 17, 18, 19 face the mandril 16.

FIG. 4 illustrates the manner in which the various webs are wound on the rotating, driven mandril 16. The edge portion of the plastics-foil web 2 and the fibre web 4 are referenced in the same manner as in FIG. 2.

As will be seen from FIG. 4, the plastics-foil web is wider than the fibre web 4 and projects beyond said web along the two longitudinally extending side edges of the web 4. The two free edge portions 2″ and 2‴ of the foil web 2 will be placed upon each other on the mandril 16, as illustrated in FIGS. 2 and 4, provided that the webs 2 and 4 are fed-in at the correct angle.

In order to obtain the requisite welding temperature, the surface of the mandril 16 is heated to a temperature of, for example, 100° C. Heating of the mandril to this temperature can be effected by providing the interior of the mandril with an electrically heatable element or by using a hollow mandril 16, as illustrated in FIG. 4, and passing steam through the mandril through a line 21. When the foil 2 comprises high density plastics, however, this temperature is not sufficient but must be raised in the region of the overlapping edge portions 2′, 2″, such that these portions either become tacky or melt. These edge portions can be heated to the requisite temperature by means of a gas burner 20 or some other suitable heating element. As before mentioned, when the plastics-foil web 2 comprises a relatively thick high density plastics, the web should be pre-heated to a temperature beneath the softening temperature so that it reacts rapidly when the said additional heat is applied. If the foil 2 comprises a high density plastic, the fibre web 17 can be heated to a high temperature, such as, for example, 160° C. If the two edge portions 2′ and 2″ lying against each other are only heated in this way to a temperature of 100° C., i.e. a temperature which lies beneath the melting point of high density plastics, sufficient heat can be transmitted to the edge portions 2′, 2″ to permit the said edge portions to be welded together. In this case, the edge portions will not be welded together directly at the location at which they meet each other on the mandril 16, but first, for example, at the location A. The pressure force required to possibly press the two foil edges together is provided by the heated fibre web 17, as illustrated in FIG. 2. The requisite alignment of the foil web 2 and the fibre web 4, such that the edge portions 2″, 2‴ will overlap each other, is obtained by mutually orienting the axes of rotation of the various direction rollers 5, 6, 8, 12 and 13 and the axis of rotation of the mandril 16.

I claim:

1. A method of manufacturing cylindrical tubes in which a plastics-foil web (2) made of a heat-meltable plastics materials, and a first fibre web (4) are helically wound on a rotating, heated mandril (16) with the plastics-foil web in contact with the mandril, the surface of the fibre web facing the plastics-foil web being coated with a plastics layer which can be heated to a tacky state or to a molten state such as to be joined with the plastics-foil web, and in which an edge portion along one longitudinal edge of the plastics-foil web is heat-welded to an edge portion along the opposing longitudinal edge of the plastics-foil web during winding of the webs on the mandril, characterized in that there is used a plastics-foil web whose two longitudinally extending, parallel edge portions (2″, 2‴) extend beyond the two longitudinally extending parallel edge portions (4′, 4″) of the fibre web, and that the plastics-foil web and the fibre web are fed into the mandril at a common angle such that one free edge portion (2‴) of the plastics-foil web will overlap the other free edge portion (2″) outside of the adjacent edge portions (4′, 4″) of the fibre web; in that heat is applied to said overlapping edge portions of the plastics-foil web; and that a further, heated fibre web (17) is wound on the helically wound plastics-foil web and the first fibre web in a manner such as to press the overlapping edge portions (2″, 2‴), against the cylindrical mandrel (16) and cause said edge portions to be welded together, so as to form a smooth, even cylindrical surface on the interior of the tube.

2. A method according to claim 1, characterised in that prior to contacting the madril (16) the plastics-foil web (2) is heated to a temperature beneath the softening temperature, and in that the requisite further heat supply for welding the mutually overlapping portions of the plastics-foil web (2) is obtained through separate heat sources (20, 21).

3. A method according to claim 2, characterised in that said additional heat supply is obtained by heating the mandril.

4. A method according to claim 2, characterised in that at least one heat source (20) having an open flame is arranged to heat the mutually overlapping edge portions (2″, 2‴) of the plastics-foil web (2).

5. A method according to any one of claims 1–4, characterised in that the mandril is heated to a temperature slightly below the softening temperature of the plastics-foil web.

* * * * *